United States Patent [19]

Wisotsky

[11] 4,338,205

[45] Jul. 6, 1982

[54] LUBRICATING OIL WITH IMPROVED DIESEL DISPERSANCY

[75] Inventor: Max J. Wisotsky, Highland Park, N.J.

[73] Assignee: Exxon Research & Engineering Co., Florham Park, N.J.

[21] Appl. No.: 181,150

[22] Filed: Aug. 25, 1980

[51] Int. Cl.$^3$ .................. C10M 1/54; C10M 1/44; C10M 1/40

[52] U.S. Cl. .................. 252/32.5; 252/33; 252/46.3; 252/47.5; 252/49.6; 252/49.9

[58] Field of Search .................. 252/49.6, 47.5, 49.9, 252/46.3, 32.5, 33

[56] References Cited

U.S. PATENT DOCUMENTS

| | | | |
|---|---|---|---|
| 3,087,936 | 4/1963 | Le Suer | 252/49.6 X |
| 3,113,106 | 12/1963 | Klass et al. | 252/49.6 |
| 3,254,025 | 5/1966 | Le Suer | 252/49.6 X |
| 3,282,955 | 11/1966 | Le Suer | 252/49.6 X |
| 3,284,409 | 11/1966 | Dorer | 252/49.6 X |
| 3,338,832 | 8/1967 | Le Suer | 252/49.6 X |
| 3,344,069 | 9/1967 | Stuebe | 252/49.6 |
| 3,491,025 | 1/1970 | Lee | 252/49.6 |
| 4,097,389 | 6/1978 | Andress, Jr. | 252/49.6 X |
| 4,173,540 | 11/1979 | Lonstrays et al. | 252/49.6 |

FOREIGN PATENT DOCUMENTS 2038840  7/1980  United Kingdom .............. 252/49.6

*Primary Examiner*—Thomas A. Waltz
*Attorney, Agent, or Firm*—J. J. Mahon

[57] ABSTRACT

Alkenyl succinimide or borated alkenyl succinimide dispersants as exemplified by a polyisobutenyl succinic anhydride-alkylene polyamine reaction product are substantially improved in their dispersancy properties in diesel engines by treating such dispersants at elevated temperatures with an oil-soluble strong acid, such as an alkaryl sulfonic acid or a phosphoric acid, such as a dialkyl monoacid phosphate. The treated dispersants are included in conventional lubricating oil formulations.

9 Claims, No Drawings

LUBRICATING OIL WITH IMPROVED DIESEL DISPERSANCY

This invention relate to lubricating oil compositions exhibiting improved dispersancy in diesel engines. More particularly, the invention relates to a method of improving conventional alkenyl succinimide and borated alkenyl succinimide and borated alkenyl succinimide dispersants through use of oil-soluble organic acids.

It is widely recognized that lubricating oils for diesel engines are typically subjected to severe engine operating conditions and that providing a highly potent sludge dispersant is an important objective in the industry for diesel engine lubricating oil formulations.

Dispersants based upon the reaction product of various polyamines with alkenyl hydrocarbon substituted succinic anhydrides or acids, as well as the borated derivatives thereof, are known in the art and are disclosed, for example, in U.S. Pat. No. 3,172,892, issued Mar. 9, 1965 to LeSuer et al. and U.S. Pat. No. 3,933,659, issued Jan. 20, 1976 to Lyle et al. The alkenyl portion of these dispersants is typically a polymer of a $C_2$-$C_5$ monoolefin, especially polyisobutylene.

The present invention provides enhancement of the dispersant potency of these alkenyl succinimide and borated alkenyl succinimide dispersants and diesel engines through use of very minor amounts of certain organic acids.

In accordance with the present invention, there are provided lubricating oil compositions exhibiting improved dispersancy in diesel engines comprising a lubricating oil and an acid-treated, oil-soluble alkenyl succinimide or borated alkenyl succinimide dispersant, said dispersant being acid-treated by having incorporated therein about 0.1 mole to 0.5 mole, preferably 0.2 to 0.3 mole, per mole of dispersant, of an oil-soluble organic acid having a pK of about $-10$ to $+5$, pK being the dissociation constants of the acid in water.

Oil-soluble alkenyl succinimide ashless dispersants are those formed by reacting a polyalkenyl succinic acid or anhydride with a polyalkyleneamine. The alkenyl group of the succinic acid or anhydride is derived from a polymer of a $C_2$ to $C_5$ monoolefin, especially a polyisobutylene wherein the polyisobutenyl group has a number average molecular weight ($\overline{M}n$) of about 700 to about 5,000, more preferably about 900 to 1,500. While homopolymers of ethylene, propylene, butylene, isobutylene and pentene are preferred, copolymers of these mono-olefins are also suitable for providing the polyalkenyl succinic acid or anhydride. Preferred are the polyisobutenyl succinic anhydrides within the aforesaid molecular weight range.

Suitable polyamines for reaction with the aforesaid succinic acid or anhydrides to provide the succinimide are those polyalkyleneamines represented by the formula $NH_2(CH_2)_n$—$(NH(CH_2)_n)_m$—$NH_2$ wherein n is 2 to 3 and m is 0 to 10. Illustrative are ethylene diamine, diethylene triamine, triethylene tetramine, tetraethylene pentamine, which is preferred, tetrapropylene pentamine, pentaethylene hexamine and the like, as well as the commercially available mixtures of such polyamines. These amines are reacted with the alkenyl succinic acid or anhydride in ratios of about 1:1 to 10:1 moles of alkenyl succinic acid or anhydride to polyamine, and preferably in a ratio of about 2:1.

The borated alkenyl succinimide dispersants are also well known in the art as disclosed in U.S. Pat. No. 3,254,025. These derivatives are provided by treating the alkenyl succinimide with a boron compound selected from the group consisting of boron oxides, boron halides, boron acids and esters thereof, in an amount to provide from about 0.1 atomic proportion of boron to about 10 atomic proportions of boron for each atomic proportion of nitrogen in the dispersant. The borated product will generally contain about 0.1 to 2.0, preferably 0.2 to 0.8, weight percent boron based upon the total weight of the borated dispersant. Boron is considered to be present as dehydrated boric acid polymers attaching as the metaborate salt of the imide. The boration reaction is readily carried out adding from about 1 to 3 weight percent based on the weight of dispersant, of said boron compound, preferably boric acid, to the dispersant as a slurry in mineral oil and heating with stirring from about 135° to 165° C. for about 1 to 5 hours followed by nitrogen stripping and filtration of the product.

Such alkenyl succinimide ashless dispersants and borated derivatives thereof are used customarily in lubricating oil compositions in amounts ranging from 0.1 to 10 percent, preferably 0.5 to 5 percent by weight based upon the total weight of the finished compositions. The same amounts are applicable to the acid treated diesel oil dispersants of the present invention.

The improved acid-treated alkenyl succinimide and borated alkenyl succinimide dispersants of the present invention are prepared by adding a suitable acid to a solution of dispersant in hydrocarbon lubricating oil base stock, preferably a concentrated solution of about 40 to 60 wt. % dispersant, preferably about 50 wt. %, is used. The same lubricating oil base stock used in formulating the finished oil is a convenient vehicle for providing the solution. Preferred base stocks are paraffin mineral oils having a viscosity of about 20 to 100 cS min. (100° F.) and blends of such oils. The acid treatment is effected by heating the solution of dispersant to about 80° to 200° C., preferably to about 100° to 175° C., such as 150° C., and adding thereto 0.1 to 0.5 mole of a suitable organic acid per mole of dispersant. The preferable range of addition is about 0.2 to 0.3 mole per mole of polyalkenyl succinimide or borated polyalkenyl succinimide dispersant. The mixture is stirred at this temperature for about 15 minutes to 3 hours until the acid reacts into the system. While not wishing to be bound by this theory, it is believed that at this relatively elevated temperature, a capping reaction occurs whereby an amide is formed between unreacted amino moieties and the organic acid additive. A convenient method of conducting this acid treatment is to add the organic acid as the final step in the dispersant preparation process, i.e., after boration or after reaction of the polyalkenyl succinic anhydride with the alkylene polyamine. Subsequent to this, conventional lubricating oil blending techniques are followed to provide finished lube oils exhibiting improved dispersancy in diesel engines.

The oil-soluble organic acid can be used in accordance with this invention and may be generally classified as those acids containing a hydrogen dissociating moiety which has a pK of $-10$ to about $+5.0$. The term pK can be defined as the negative logarithm to the base 10 of the equilibrium constant for the dissociation of the oil-soluble organic acid.

As used herein, oil-soluble is defined as those organic acids which themselves are substantially soluble in mineral oil at 20° C. to at least 50 weight percent.

Representative classes of the strong organic acids containing oil-solubilizing groups are the hydrocarbyl substituted maleic acids, malonic acids, phosphoric acids, thiophosphoric acids, phosphonic acids, thiophosphonic acids, phosphinic acids, thiophosphinic acid, sulfonic acid, sulfuric acid, and alpha-substituted or nitrilocarboxylic acids wherein the oil-solubilizing group or groups are hydrocarbyl and containing from 8 to 70 or more, preferably from 20 to 40, optimally 25 to 35, total carbon atoms. These ranges are considered to approximate oil-solubility for the general classes of organic acids suitable herein.

A preferred category of organic acids for use in this invention are the oil-soluble sulfonic acids which are typically alkaryl sulfonic acids. These sulfonic acids are typically obtained by the sulfonation of alkyl substituted aromatic hydrocarbons such as those obtained from the fractionation of petroleum by distillation and/or extraction or by the alkylation of aromatic hydrocarbons as, for example, those obtained by alkylating benzene, toluene, xylene, naphthalene, diphenyl and the halogen derivatives such as chlorobenzene, chlorotoluene and chloronaphthalene. The alkylation may be carried out using known processes in the presence of a catalyst such as $ACl_3$ or $BF_3$ with alkylating agents having from 9 to about 70 carbon atoms, such as, haloparaffins, olefins that may be obtained by dehydrogenation of paraffins, polyolefins from ethylene, propylene, etc. Preferred sulfonic acids are those obtained by the sulfonation of hydrocarbons prepared by the alkylation of benzene or toluene with tri-, tetra- or pentapropylene fractions obtained by the polymerization of propylene. The alkaryl sulfonic acids contain from 9 to 70, preferably from 18 to 34, optimally from 22 to 30, carbon atoms per alkyl substituent in the aryl group and these groups may be monoalkylated or polyalkylated aryl moieties.

Particularly preferred is an alkylated benzene sulfonic acid having a molecular weight (Mn) of from 475 to 600 wherein the alkyl substituent groups contain about 18 to 34 carbons.

The oil soluble phosphorous-containing acids are a second preferred category useful in the present invention can be described as hydrocarbyl substituted derivatives of phosphoric acid, $H_3PO_4$, phosphonic acid $HP(O)(OH)_2$ or phosphinic acid $H_2P(O)(OH)$ which have at least one free acidic hydrogen and one or two hydrogens are replaced by one or two $C_8$–$C_{70}$ hydrocarbyl radicals such as alkyl, aryl, alkaryl, aralkyl and alicyclic hydrocarbon radicals to provide the required oil solubility. $C_9$ to $C_{30}$ mono- or di-alkyl (mono- or di-acid phosphates) derivatives of a $H_3PO_4$ are a particularly preferred sub-category of acids for use in improving diesel dispersancy and tridecyl mono/dihydrogen phosphonic acid is a preferred embodiment. Suitable acids include also the corresponding $C_9$–$C_{70}$ hydrocarbyl mono or di-substituted thiophosphoric, thiophosphinic or thiophosphonic acids.

The acids are usually prepared by reacting $P_2O_5$ or $P_2S_5$ with the desired alcohol or thiol to obtain the substituted phosphoric acids.

The desired hydroxy or thiol compound should contain hydrocarbyl groups of from about 8 to about 70 carbon atoms with preferably about 15 total carbon atoms average to provide oil solubility to the product. Examples of suitable compounds are hexyl alcohol, 2-ethylhexyl alcohol, nonyl alcohol, dodecyl alcohol, stearyl alcohol, amylphenol, octylphenol, nonylphenol, methylcyclohexanol, alkylated naphthol, etc., and their corresponding thio analogues; and mixtures of alcohols and/or phenols such as isobutyl alcohol and nonyl alcohol; orthocresol and nonylphenol; etc., and mixtures of their corresponding thio analogues.

In the preparation of the hydrocarbyl substituted thiophosphoric acids, any conventional method can be used, such as, the preparation described in U.S. Pat. Nos. 2,552,570, 2,579,038 and 2,689,220. By way of illustration, a dialkaryl substituted dithiophosphoric acid is prepared by the reaction of about 2 moles of $P_2S_5$ with about 8 moles of a selected alkylated phenyl, e.g., a mixture of $C_8$–$C_{12}$ alkyl substituted phenols, i.e., nonyl phenol, at a temperature of from 50° C. to 125° C. for about 4 hours. In the preparation of hydrocarbyl substituted thiophosphinic acids, as conventionally known, a disubstituted phosphine is oxidized to give disubstituted thiophosphinic acids (see F. C. Witmore's Organic Chemistry", published by Dover Publications, New York, NY (1961) page 848).

Particularly preferred for preparation of oil-soluble phosphoric, phosphonic and phosphinic acids useful in the process of the invention are mixed aliphatic alcohols obtained by the reaction of olefins of carbon monoxide and hydrogen and substituted hydrogenation of the resultant aldehydes which are commonly known as "Oxo" alcohols, which Oxo alcohols for optimum use according to this invention will contain an average of about 13 carbon atoms, such as a di-$C_{13}$ Oxo phosphoric acid. The oil-soluble phosphorous-containing acids are readily prepared from these alcohols by reaction with $P_2O_5$ as is well known in the art.

Another class of useful strong organic acids are oil-soluble hydrocarbyl substituted maleic acids of the general formula:

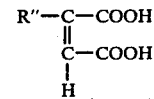

wherein R'' is an oil-solubilizing, hydrocarbyl group containing from about 9 to 70 carbons. Representative of these oil-soluble maleic acid derivatives are pentadecylmaleic acid, hexadecylmaleic acid, eicosylmaleic acid, triacontanylmaleic acid and polymers of $C_2$–$C_5$ monoolefins having from 15 to 70 or more carbons substituted onto said maleic acid.

Additional suitable strong acids are those oil-soluble $C_9$–$C_{70}$ hydrocarbyl-containing substituted malonic acids of the general formula:

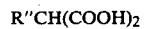

wherein R'' has the meaning set forth above as an oil-solubilizing hydrocarbyl group which is illustrated by the following representative compounds which include the malonic acid counterparts of the above-referenced hydrocarbyl substituted maleic acids, i.e., pentadecylmalonic acid, hexadecyl malonic acid, etc.

Another class of useful acids are oil-soluble $C_9$–$C_{70}$ hydrocarbyl substituted sulfuric acids of the general formula R''$HSO_4$ wherein R'' is the hydrocarbyl oil-solubilizing group as exemplified by pentadecylsulfuric acid, hexadecylsulfuric acid, eicosylsulfuric acid, triacontanylsulfuric acid, etc.

A further group of acids which can be used in accordance with this invention are oil-soluble mono- and di-alpha-substituted hydrocarbyl carboxylic acids having the general formula:

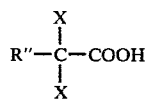

wherein R″ is a $C_9$–$C_{70}$ hydrocarbyl, oil-solubilizing group as referenced above and X refers to hydrogen, nitrilo, nitro, halo, such as chloro, or a cyano group or groups. These materials are represented by the following: alpha-nitro and alpha-di-nitro, substituted acids, such as dodecanoic, pentadecanoic, octadecanoic, docosanoic, octacosanoic, tricontanoic, tetracontanoic and the like.

The invention is further illustrated by the following examples which are not to be considered as limitative of its scope.

EXAMPLE 1

A paraffinic mineral oil solution was prepared containing 49 wt. % of a polyisobutylene succinic anhydride polyamine dispersant ($\overline{M}n$=980; 2.2 moles of succinic anhydride per mole of polyamine). The polyamine was a mixture of alkylene polyamines approximating tetraethylene pentamine available under the trade name "DOW E-100" from Dow Chemical Co., Midland, Michigan. This dispersant has been borated by reaction with a slurry of 1.4 moles of boric acid in mineral oil and the final product contained 1.5 wt. % nitrogen and 0.5 wt. % boron.

Three acid treated dispersant materials in accordance with this invention were provided by:

(1) Incorporating into a 50 wt. % solution of dispersant in the mineral oil 1.2 wt. % of tridecyl mono- di-acid phosphate by adding in the phosphate and stirring the mixture at about 150° C. for 30 minutes.

(2) Incorporating into the dispersant solution 2.5 wt. % (0.2 molar equivalents) of an alkyl benzene sulfonic acid having an $\overline{M}n$=530 by adding in the acid to a 50 wt. % solution of dispersant in the mineral oil at 150° C.

(3) Incorporating into the dispersant solution 1.0 wt. % (0.08 molar equivalents) of the same sulfonic acid as in subparagraph 2 above using the same blending technique.

Lubricating oil formulations were prepared containing the standard borated dispersant before acid modification, noted below as Base Formulation and formulations containing each of the three acid modified borated dispersants, and noted corresponding below as Formulations 1, 2, and 3. Each formulation was an SAE 10W30 quality crankcase oil which also contained conventional amounts of an olefin copolymer V.I. improver, a rust inhibitor, a metal detergent and a zinc dialkyldithiophosphate in a mineral oil base. These formulated oils were each subjected to engine testing in the "Caterpillar 1H-2" test which is an industry and government accepted test for the dispersancy and overall effectiveness of diesel oil lubricants. The results and explanation of the test are given below:

| Formulation | 240 Hour Caterpillar 1H-2 Test | |
|---|---|---|
| | TGF[2] | WTD[3] |
| Base[1] | 16.6% | 189.1 |
| No. 1 | 0.5% | 55.2 |
| No. 2 | 6.0% | 37.0 |
| No. 3 | 1.0% | 106 |

[1]Base - this result is an average data base used for comparison in evaluating new diesel formulations and is an average of 25 engine tests.
[2]TGF - top groove fill, % deposits in groove
[3]WTD - weighted total demerits The Caterpillar 1H-2 test is also a U.S. Federal Test Method 791-346 and is used to meet military specifications, such as MIC-C-21260B and industry specifications, such as SAE 183 and General Moters GM 6146M. The purpose of the test is to determine the effect of an oil on ring sticking, wear and accumulation of deposits. The test uses a single cylinder Caterpillar diesel 5¼″-×6½″.

For the 1H-2 test WTD (Weighted Total Demerits) is the principal value and for a 240 hour test, the target specification is a value below the 75–80 range. This is derived from the published specification target of WTD 140 for a 480 hour test. WTD is a cumulative rating based on observation of deposits in the groove and land areas of the piston and lacquer on piston skirts with all these specific evalations being weighted according to their relative importance and the final WTD value being calculated in accordance with the test procedure.

What is claimed is:

1. A lubricating oil composition exhibiting improved dispersancy in a diesel engine comprising a hydrocarbon lubricating oil and an acid-treated, oil-soluble borated alkenyl succinimide dispersant, said dispersant being acid treated after boration by having incorporated therein, per mole of said succinimide, about 0.1 to 0.5 mole of an oil-soluble organic acid having a pK of −10 to +5 containing a $C_9$–$C_{70}$ hydrocarbyl group, said organic acid being a sulfonic acid, a hydrocarbyl substituted derivative of $H_3PO_4$, $HP(O)(OH)_2$ or $H_2P(O)(OH)$ which has at least one free acidic hydrogen, a hydrocarbyl mono or di-substituted thiophosphoric, thiophosphinic or thiophosphonic acid, a hydrocarbyl substituted maleic acid, a hydrocarbyl substituted sulfuric acid, or a mono- or di-alpha-substituted hydrocarbyl carboxylic acid, the alpha-substituent being hydrogen, nitrilo, nitro, halo or cyano.

2. The composition of claim 1 wherein the organic acid is a alkaryl sulfonic acid.

3. The composition of claim 2 wherein the sulfonic acid is a $C_9$–$C_{70}$ alkyl substituted benzene sulfonic acid.

4. The composition of claim 3 wherein the acid treatment is with about 0.2 to 0.3 mole of said acid.

5. The composition of claim 4 wherein the acid is an alkylated benzene sulfonic acid having an $\overline{M}n$ of from about 475 to 600.

6. The composition of claim 1 wherein the acid is a $C_9$–$C_{70}$ hydrocarbyl substituted phosphoric acid.

7. The composition of claim 6 wherein the acid is a $C_9$–$C_{30}$ mono- or di- alkyl acid phosphate.

8. The composition of claim 6 wherein the acid is tridecyl mono/dihydrogen phosphoric acid.

9. The composition of claim 8 wherein the acid treatment is with 0.2 to 0.3 mole of acid per mole of said succinimide dispersant.

* * * * *